United States Patent
Azami

(10) Patent No.: US 9,390,760 B2
(45) Date of Patent: Jul. 12, 2016

(54) IMAGING SYSTEM, IMAGING DEVICE AND PROGRAM

(71) Applicant: JVCKENWOOD Corporation, Yokohama, Kanagawa (JP)

(72) Inventor: Tomohiro Azami, Kanagawa (JP)

(73) Assignee: JVCKENWOOD CORPORATION, Yokohama-Shi, Kanagawa (JP)

( * ) Notice: Subject to any disclaimer, the term of this patent is extended or adjusted under 35 U.S.C. 154(b) by 161 days.

(21) Appl. No.: 14/297,076

(22) Filed: Jun. 5, 2014

(65) Prior Publication Data

US 2014/0369664 A1   Dec. 18, 2014

(30) Foreign Application Priority Data

Jun. 13, 2013   (JP) .................................. 2013-124298

(51) Int. Cl.
 H04N 5/923 (2006.01)
 H04N 9/80 (2006.01)
 G11B 27/30 (2006.01)
 G11B 27/32 (2006.01)

(52) U.S. Cl.
 CPC ............ *G11B 27/3036* (2013.01); *G11B 27/32* (2013.01)

(58) Field of Classification Search
 USPC .................................. 386/239–248, 200–234
 See application file for complete search history.

(56) References Cited

U.S. PATENT DOCUMENTS

| 2009/0304348 A1* | 12/2009 | Hio ....................... G11B 27/322 386/223 |
| 2013/0191752 A1* | 7/2013 | Lapierre ............... G06F 3/0484 715/723 |

FOREIGN PATENT DOCUMENTS

JP   2009-296526 A   12/2009

* cited by examiner

*Primary Examiner* — Hung Dang
(74) *Attorney, Agent, or Firm* — Procopio, Cory, Hargreaves & Savitch LLP

(57) ABSTRACT

An imaging system includes an imaging device and a portable terminal device. The portable terminal device includes a marker time information generation unit, a time difference detection unit, and a correction unit. The marker time information generation unit generates marker time information containing a marker input to a video file generated by the imaging device and input time of the marker in association with each other. The time difference detection unit detects a time difference between time measured by the clock of the imaging device and time measured by the clock of the portable terminal device. Then, the correction unit corrects the input time of the marker contained in the marker time information based on the time difference detected by the time difference detection unit and thereby generates corrected marker time information.

7 Claims, 10 Drawing Sheets

MARKER TYPE TABLE

| MARKER ID | MARKER |
|---|---|
| 10 | GAME START |
| 20 | GAME END |
| 30 | SCORE |
| 40 | CHECK |
| 50 | SMILE |
| 60 | GOOD |

Fig. 4

CORRECTED MARKER TIME INFORMATION

| MARKER ID | INPUT TIME |
|---|---|
| 10 | 10 : 00:02 |
| 30 | 10:12:08 |
| 30 | 10:20:36 |
| 50 | 10:31:48 |
| 40 | 10:40:13 |
| 20 | 10:45:02 |
| ⋮ | ⋮ |

Fig. 5

MARKER TIME INFORMATION

| MARKER ID | INPUT TIME |
|---|---|
| 10 | 09:59:59 |
| 30 | 10:12:05 |
| 30 | 10:20:33 |
| 50 | 10:31:45 |
| 40 | 10:40:10 |
| 20 | 10:44:59 |

CORRECTION
(ADD 3 SECONDS TO INPUT TIME)

CORRECTED MARKER TIME INFORMATION

| MARKER ID | INPUT TIME |
|---|---|
| 10 | 10:00:02 |
| 30 | 10:12:08 |
| 30 | 10:20:36 |
| 50 | 10:31:48 |
| 40 | 10:40:13 |
| 20 | 10:45:02 |

IMAGING SYSTEM, IMAGING DEVICE AND PROGRAM

INCORPORATION BY REFERENCE

This application is based upon and claims the benefit of priority from Japanese patent application No. 2013-124298, filed on Jun. 13, 2013, the disclosure of which is incorporated herein in its entirety by reference.

BACKGROUND OF THE INVENTION

1. Field of the Invention

The present invention relates to an imaging system, an imaging device, and a program.

2. Description of Related Art

There is a technique that, when a user takes video or still images using an imaging device such as a video camera, the user can add markers to the taken image data automatically or manually in order to identify or search for the images. With use of such markers, the user can easily organize and search for the taken image data.

In Japanese Unexamined Patent Application Publication No. 2009-296526, for example, a mark adding system including a marker device that adds a marker and a video camera device is disclosed. The marker device and the video camera device are connected via wireless connection. By the operation of the marker device, a marker can be added to a clip file recorded by the video camera device.

In the above literature, when the marker device and the video camera device communicate via Bluetooth (registered trademark) or Wi-Fi Direct, the distance between the marker device and the video camera device needs to rather short. However, in the situation where the marker device (a person taking video) and the video camera device are distant such as when taking video of outdoor sports, stable wireless communication cannot be attained, which makes it difficult to input markers. Further, although the communication distance can be extended by placing an access point between the marker device and the video camera device, it takes costs to install the access point and makes the communication delay not negligible.

On the other hand, if a marker is input in the state where the marker device and the video camera device are not connected (in the offline state), synchronization cannot be achieved between the marker input time and the time of video taken by the video camera device, which makes it difficult to input a marker at an appropriate position of the video.

The present invention has been accomplished to solve the above problems and an exemplary object of the present invention is thus to provide an imaging system, an imaging device, and a program that can input a marker at an appropriate position of video even when an imaging device and a portable terminal device that inputs a marker are not connected with each other.

SUMMARY OF THE INVENTION

One exemplary aspect of the present invention is an imaging system including an imaging device (1) including a first clock unit (clock 208) that measures time, an imaging unit (100) that generates imaging data of video by imaging processing, and a storage unit (card type recording medium 302) that stores a video file on a basis of the imaging data in association with imaging time of the imaging data measured by the first clock unit; a portable terminal device (5) including a marker input unit (52) that inputs a marker to the video file, a second clock unit (clock 53) that measures time, and a marker time information generation unit (541) that generates marker time information containing the marker input by the marker input unit and input time of the marker measured by the second clock unit in association with each other; a time difference detection unit (542) that detects a time difference between time measured by the first clock unit and time measured by the second clock unit; and a correction unit (543) that corrects the input time of the marker contained in the marker time information based on the time difference detected by the time difference detection unit and thereby generates corrected marker time information.

One exemplary aspect of the present invention is an imaging device (1) connectable with a portable terminal device (5) capable of inputting a marker, including an imaging unit (100) that generates imaging data of video by imaging processing, a first clock unit (clock 208) that measures time, a storage unit (card type recording medium 302) that stores a video file on a basis of the imaging data in association with imaging time of the imaging data measured by the first clock unit, a receiving unit (wireless module 309) that receives marker time information from the portable terminal device, the marker time information containing a marker input to the video file by the portable terminal device (5) capable of inputting a marker and input time of the marker measured by a second clock unit (clock 53) included in the portable terminal device in association with each other, a time difference detection unit (542) that detects a time difference between time measured by the first clock unit and time measured by the second clock unit, and a correction unit (543) that corrects the input time of the marker contained in the marker time information based on the time difference detected by the time difference detection unit and thereby generates corrected marker time information.

One exemplary aspect of the present invention is a program for controlling a portable terminal device (5) connected to an imaging device (1) including a first clock unit (clock 208) that measures time, an imaging unit (100) that generates imaging data of video by imaging processing, and a storage unit (card type recording medium 302) that stores a video file on a basis of the imaging data in association with imaging time of the imaging data measured by the first clock unit, the program causing a computer to execute a step of inputting a marker to the video file, a step of measuring time by a second clock unit (clock 53) included in the portable terminal device, a step of generating marker time information containing the input marker and input time of the marker measured by the second clock unit in association with each other, a step of detecting a time difference between time measured by the first clock unit and time measured by the second clock unit, and a step of correcting the input time of the marker contained in the marker time information based on the detected time difference and thereby generating corrected marker time information.

According to the above aspects of the present invention, it is possible to provide an imaging system, an imaging device, and a program that can input a marker at an appropriate position of video even when an imaging device and a portable terminal device that inputs a marker are not connected with each other.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 4 is a marker type table according to an exemplary embodiment;

FIG. 5 is marker time information according to an exemplary embodiment;

DESCRIPTION OF THE EXEMPLARY EMBODIMENTS

Figure 1:
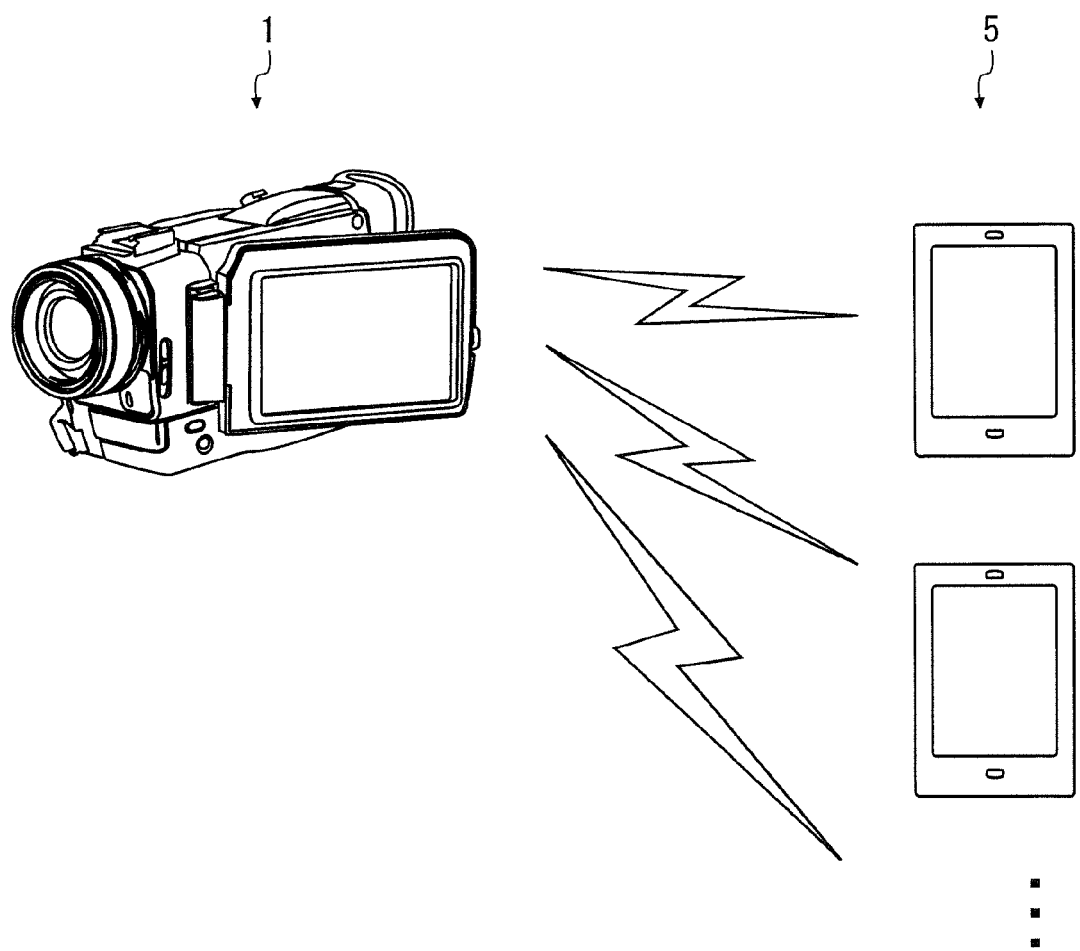
FIG. 1 is a diagram showing a configuration of an imaging system according to an exemplary embodiment.

An exemplary embodiment of the present invention will be described hereinafter with reference to the drawings. FIG. 1 is a diagram showing a configuration of an imaging system according to an exemplary embodiment. As shown in FIG. 1, the imaging system includes an imaging device 1 and a portable terminal device 5. The imaging device 1 and the portable terminal device 5 can be connected via wireless communication. As wireless communication, Wi-Fi Direct, Bluetooth (registered trademark) and the like can be used. Note that the imaging device 1 and the portable terminal device 5 may be connected by wired using a USB cable and the like. Further, the imaging device 1 and the portable terminal device 5 are not necessarily connected in one-to-one correspondence. A plurality of portable terminal devices 5 may be connected to one imaging device 1.

<Configuration of Imaging Device 1>

Figure 2:
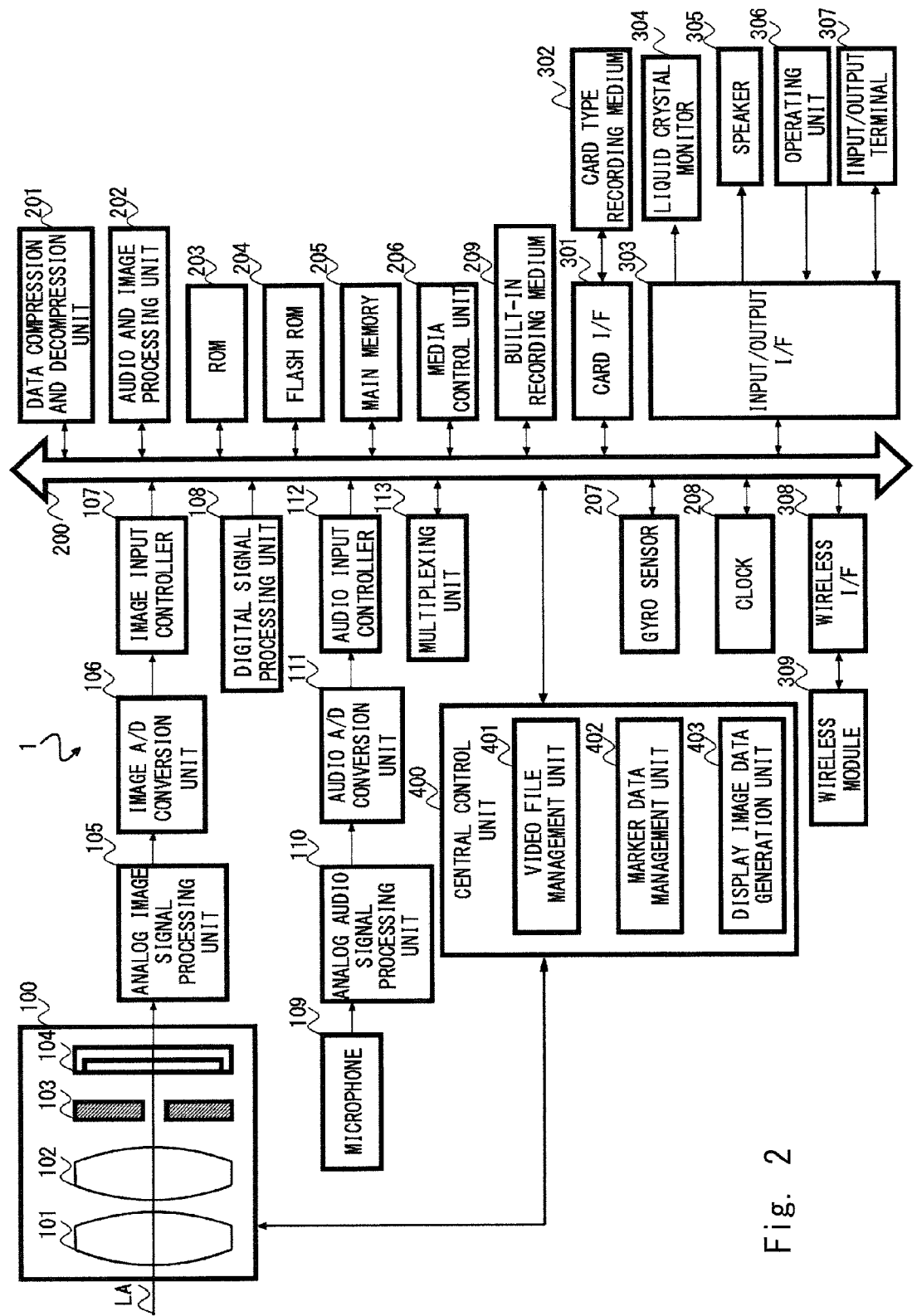
FIG. 2 is a block diagram showing a configuration of an imaging device according to an exemplary embodiment.

A configuration of the imaging device 1 according to this exemplary embodiment is described hereinafter with reference to the block diagram of FIG. 2. The imaging device 1 can take still images or moving video using a lens unit and an image pickup element for imaging. The form and structure of imaging device 1 are not particularly limited as long as it can take still images or video and includes a display unit such as a liquid crystal monitor, for example. Thus, the imaging device 1 may be any electronic equipment including an imaging unit and a display unit (e.g. a portable terminal device such as a smartphone), not limited to a video camera.

The imaging device 1 has an imaging unit 100 composed of a zoom lens 101, a focus lens 102, a diaphragm 103 and an image pickup element 104. The zoom lens 101 moves along an optical axis LA by a zoom actuator, which is not shown. Likewise, the focus lens 102 moves along the optical axis LA by a focus actuator, which is not shown. The diaphragm 103 is driven by a diaphragm actuator, which is not shown. The image pickup element 104 is a CCD (Charge Coupled Device), a CMOS (Complementary Metal Oxide Semiconductor) or the like.

Imaging using the imaging unit 100 is performed in the following procedure. The image pickup element 104 converts light having passed through the zoom lens 101, the focus lens 102 and the diaphragm 103 from an optical to electrical signal and thereby generates an analog image signal of a subject. An analog image signal processing unit 105 amplifies the analog image signal, and then an image A/D conversion unit 106 converts the amplified signal to digital image data. An image input controller 107 grabs the digital image data output from the image A/D conversion unit 106 as imaging data and stores the data into a main memory 205 through a bus 200.

A digital signal processing unit 108 grabs the imaging data stored in the main memory 205 through the bus 200 based on an instruction from a central control unit 400, performs specified signal processing and generates data composed of a luminance signal and a color difference signal. The digital signal processing unit 108 further performs digital corrections such as offset processing, white balance adjustment, gamma correction, RGB interpolation, noise reduction, edge smoothing, color tone adjustment and light source type determination.

A microphone 109 catches the surrounding sounds at the time of imaging and generates an analog audio signal. An analog audio signal processing unit 110 amplifies the analog audio signal, and then an audio A/D conversion unit 111 converts the amplified signal into digital audio data. An audio input controller 112 stores the digital audio data output from the audio A/D conversion unit 111 together with the imaging data into the main memory 205.

A multiplexing unit 113 performs multiplexing of compressed data of the imaging data and the digital audio data stored in the main memory 205 and thereby generates stream data. Further, the multiplexing unit 113 performs demultiplexing of the stream data stored in a card type recording medium 302 and generates compressed data of video and compressed data of audio separately from each other.

A data compression and decompression unit 201 grabs the imaging data and the digital audio data stored in the main memory 205 through the bus 200 and performs specified compression and thereby generates compressed data according to an instruction from the central control unit 400. Further, the data compression and decompression unit 201 performs specified decompression on compressed data of video and compressed data of audio stored in the card type recording medium 302 or the like and thereby generates non-compressed data according to an instruction from the central control unit 400. Note that, in the imaging device 1 according to this exemplary embodiment, a compression method conforming to the JPEG standard is used for still images, and a compression method conforming to the MPEG2 or AVC/H.264 standard is used for moving video.

An audio and image processing unit 202 performs specified image processing on digital data read from the main memory 205 through the bus 200. For example, the audio and image processing unit 202 generates image data for various processing such as a menu image and an OSD image, superimposes the image data onto original imaging data read from the main memory 205 and outputs the data to a liquid crystal monitor 304. The image displayed on the liquid crystal monitor 304 as a result of the output is a composite image or a superimposed image of different image data. Note that another monitor such as an organic EL (Electro-Luminescence) monitor may be used in place of the liquid crystal monitor 304.

A ROM 203 is connected to the central control unit 400 through the bus 200 and stores a control program to be executed by the central control unit 400 and various data necessary for control. A flash ROM 204 stores various setting information related to the operation of the imaging device 1, such as user setting information.

The main memory 205 is used as a temporary storage area of imaging data (moving video and still images). The main memory 205 stores the stored multiplexed stream data (video file) into a card type recording medium 302 or a built-in recording medium 209 according to an instruction from the central control unit 400. Whether to store the stream data into the card type recording medium 302 or the built-in recording medium 209 may be selectable by a user. Note that the main memory 205 is used also as a computation work area of the central control unit 400.

A media control unit 206 controls writing of data to and reading of data from the card type recording medium 302 or the built-in recording medium 209 through a card I/F 301 according to an instruction from the central control unit 400. The card type recording medium 302 (storage unit) is an external memory such as an SD card or a compact flash (registered trademark) and it is removable from the imaging device 1. Further, the card type recording medium 302 stores a video file, a marker type table and corrected marker time information, which are described later.

A gyro sensor 207 detects a change in three-axis acceleration and angular velocity. According to a detection result of the gyro sensor 207, the liquid crystal monitor 304 changes the display direction. A clock 208 (first clock unit) generates information of date and time when taken image data is acquired and input time information indicating date and time when a marker is input. The built-in recording medium 209 is a memory such as RAM that is built in the imaging device 1.

The liquid crystal monitor 304, a speaker 305, an operating unit 306 and an input/output terminal 307 are connected to an input/output I/F 303. The liquid crystal monitor 304 displays images generated from various image data such as the imaging data temporarily recorded in the main memory 205, interface image data and various menu image data. The imaging data output to the liquid crystal monitor 304 includes not only data that is recorded in a recording medium such as a card type recording medium 302 by a user turning ON a recording button, which is not shown, of an operating unit 306 but also data related to so-called through-the-lens images that are displayed on the liquid crystal monitor 304 for a user to see images to be picked up. A speaker 305 outputs audio that is temporarily recorded in the main memory 205, for example.

The operating unit 306 is an operating button, a touch panel on the liquid crystal monitor 304 or the like and accepts operation input to the imaging device 1 by a user. An input/output terminal 307 is connected to a television monitor, PC (Personal Computer) or the like, which is not shown.

A wireless module 309 (receiving unit) transmits and receives data such as corrected marker time information, which is described later, to and from the portable terminal device 5 through the bus 200 and a wireless I/F 308. Wireless communication of various kinds of information, taken image data and the like is performed by a scheme conforming to the IEEE 802.11 standard. To be more specific, the wireless module 309 performs communication processing conforming to the wireless LAN standard such as Wi-Fi.

The central control unit 400 is a semiconductor integrated circuit that includes a CPU (Central Processing Unit), ROM (Read Only Memory) storing various kinds of programs, RAM (Random Access Memory) serving as a work area and the like. The central control unit 400 exercises control over the processing of the whole imaging device 1 such as imaging, displaying various images and specifying an image (which is referred to hereinafter as an "interface image") related to GUI (Graphic User Interface) for a user to input a marker to taken image data. In the interface image, icon images corresponding types of markers and the like to be used according to the imaging situation are appropriately placed. The central control unit 400 includes a video file management unit 401, a marker data management unit 402 and a display image data generation unit 403.

The video file management unit 401 (playing unit) executes processing such as recording, playing, copying, deletion and the like of a video file based a user operation.

The marker data management unit 402 stores corrected marker time information transmitted from the portable terminal device 5 in association with a video file into the card type recording medium 302. The corrected marker time information is information that contains a marker input for a video file and an input time of the marker in association with each other. The corrected marker time information is generated in the portable terminal device 5. Processing of generating the corrected marker time information is described later.

The display image data generation unit 403 generates display image data for displaying video together with an interface image or a marker image (image corresponding to each type of marker). Thus, the display image data generation unit 403 superimposes marker image data onto a video file. The display image data generation unit 403 outputs the generated display image data to the liquid crystal monitor 304.

The marker image data for displaying a marker image may be prestored in the card type recording medium 302 or may be acquired from a server, which is not shown, or a given storage device (so-called USB memory etc.) that is removable from the imaging device 1.

The display image data generated by the display image data generation unit 403 is output from the input/output I/F 303 to the liquid crystal monitor 304. The liquid crystal monitor 304 displays a display image for the supplied display image data. On the liquid crystal monitor 304, the display image, which is a composite image of the currently played video and the related marker image, is displayed.

<Details of Card Type Recording Medium 302>

Figure 3:
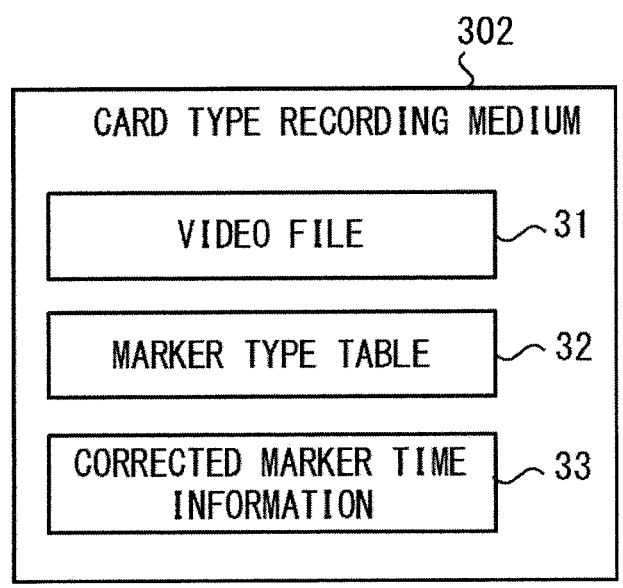
FIG. 3 is a block diagram showing a configuration of a card type recording medium according to an exemplary embodiment.

Various data stored in the card type recording medium 302 are described in detail hereinafter with reference to FIG. 3. As shown in FIG. 3, the card type recording medium 302 stores a video file 31, a marker type table 32 and corrected marker time information 33. Note that, although the card type recording medium 302 can store data other than those shown in FIG. 3, data not directly related to the present invention is not described herein.

The video file 31 is the above-described stream data, and it is data of video where imaging data and audio data are multiplexed. The card type recording medium 302 stores a plurality of video files 31. Note that the imaging time measured by the clock 208 is associated with the video file 31. The imaging time is imaging start time, imaging end time and the like of the imaging data.

The marker type table 32 is a table where a marker ID (identification information) and a marker corresponding to the marker ID are stored in association with each other. Note that the marker means an indicator indicating a given time of video. Further, the marker may be an indicator indicating a time and also text or image different from the currently played video and displayed on that video. The marker is input by a user operating the portable terminal device 5, which is described later.

FIG. 4 shows an example of the marker type table 32. In the marker type table 32 shown in FIG. 4, six types of marker IDs and markers are stored. The marker corresponding to the marker ID 10 is a game start marker for indicating the start of a game. The marker corresponding to the marker ID 20 is a game end marker for indicating the end of a game. The marker corresponding to the marker ID 30 is a score marker indicating that a score is made. The marker corresponding to the marker ID 40 is a check marker indicating the time to do checking. The marker corresponding to the marker ID 50 is a smile marker indicating that there is a smile. The marker corresponding to the marker ID 60 is a good marker indicating a good play. Note that the types of markers are not limited to those shown in FIG. 4. Further, a marker may be an image, not text. Hereinafter, an image corresponding to a marker is referred to as a marker image.

The corrected marker time information 33 is information in which a marker input for a moving image file and the marker input time are associated with each other. The corrected marker time information 33 is stored in the card type recording medium 302 in association with the video file 31. For example, a plurality of corrected marker time information 33 are associated with a plurality of video files 31 in one-to-one correspondence.

FIG. 5 shows an example of the corrected marker time information 33. For example, in the top marker, the marker ID is "10" and the input time is "10:00:02". As shown in FIG. 4, the marker with the marker ID 10 is the game start marker. Thus, the top marker of the corrected marker time information 33 indicates that the game start marker is input at the time 10:00:02. Note that the time is the one corrected in the portable terminal device 5. Further, although only "hours, minutes, seconds" are used as the input time in this exemplary embodiment for simplification of description, it is not limited thereto. For example, in the case of transmitting the corrected marker time information of several days stored in the portable terminal device 5 all together to the imaging device 1, the time information of "year, month, day" may be included in the input time. Further, the time information of "milliseconds" may be included in the input time in order to more accurately specify the input time.

<Configuration of Portable Terminal Device 5>

Figure 6:
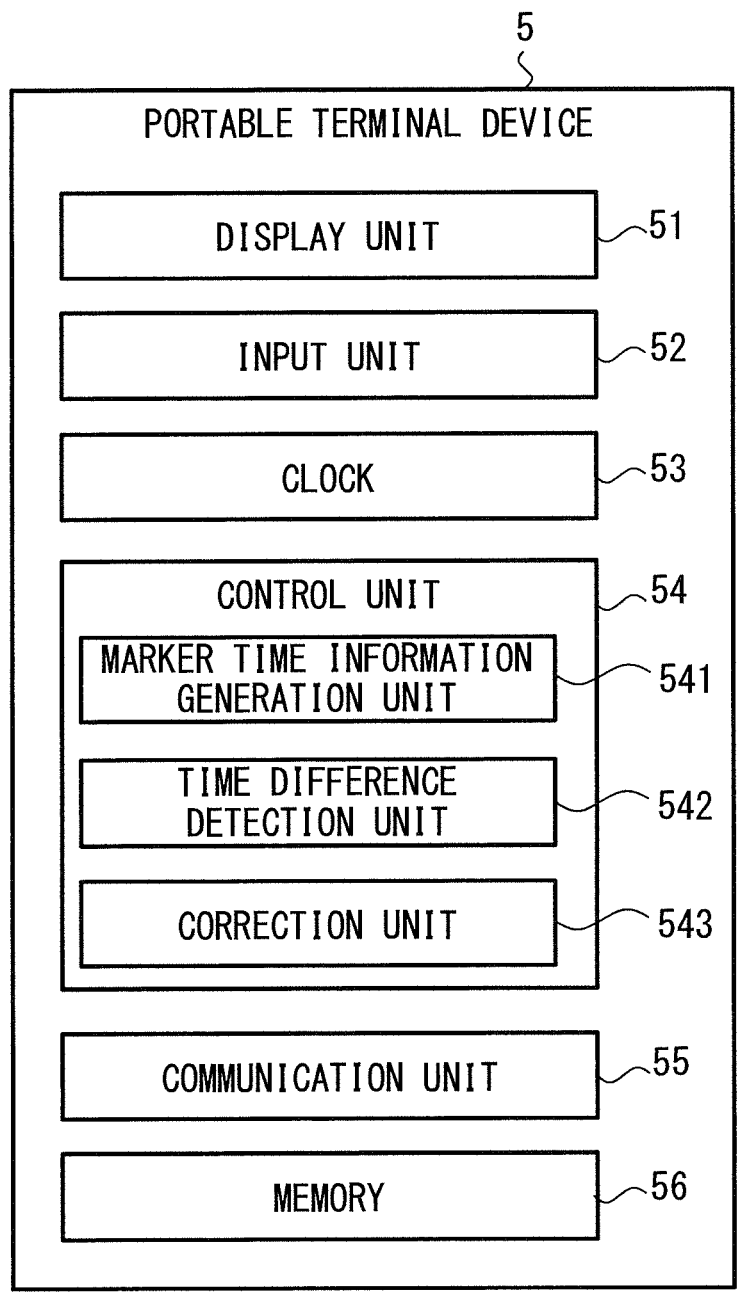
FIG. 6 is a block diagram showing a configuration of a portable terminal device according to an exemplary embodiment.

A configuration of the portable terminal device 5 according to this exemplary embodiment is described hereinafter. FIG. 6 shows a block diagram of the portable terminal device 5. The portable terminal device 5 at least includes a display unit 51, an input unit 52, a clock 53, a control unit 54, a communication unit 55 and a memory 56. The portable terminal device 5 is a cellular phone, a smartphone, a tablet PC or the like, for example.

The display unit 51 displays images generated from various kinds of imaging data such as interface image data and various menu image data. The display unit 51 is an LCD (Liquid Crystal Display) or an organic EL (Electro Luminescence) monitor, for example.

The input unit 52 (marker input unit) is an operating button, a touch panel on the display unit 51 or the like and accepts operation input to the portable terminal device 5 by a user. Further, a user can input a marker to the video file generated by the imaging device 1 using the input unit 52. The clock 53 (second clock unit) measures time in the portable terminal device 5. Note that time of the clock 53 is not synchronized with time of the clock 208 in the imaging device 1.

The control unit 54 is a semiconductor integrated circuit that includes a CPU, ROM storing various kinds of programs, RAM serving as a work area and the like. The control unit 54 exercises control over the processing of the whole portable terminal device 5. The control unit 54 includes a marker time information generation unit 541, a time difference detection unit 542, and a correction unit 543.

The marker time information generation unit 541 generates marker time information that contains the marker input by the input unit 52 and the input time of the marker measured by the clock 53 in association with each other. For example, the marker time information generation unit 541 generates marker time information by associating the marker ID with the marker input time.

The time difference detection unit 542 detects a lag between the current time in the imaging device 1 and the current time in the portable terminal device 5. In other words, the time difference detection unit 542 detects a time difference between time of the clock 208 in the imaging device 1 and time of the clock 53 in the portable terminal device 5.

The time difference detection unit 542 detects a time lag between the imaging device 1 and the portable terminal device 5 using the principle of NTP (Network Time Protocol), for example. To be specific, the portable terminal device 5 transmits a transmission request D1 for time information of the clock 208 of the imaging device 1 to the imaging device 1. The imaging device 1 receives the transmission request D1. Then, the imaging device 1 acquires time information of the clock 208 and transmits a response D2 containing the time information of the clock 208 to the portable terminal device 5. The portable terminal device 5 then receives the response D2.

Time when the portable terminal device 5 transmits the transmission request D1 (time measured by the clock 53) is T1, time when the imaging device 1 receives the transmission request D1 (time measured by the clock 208) is T2, time when the imaging device 1 transmits the response D2 (time measured by the clock 208) is T3, and time when the portable terminal device 5 receives the response D2 (time measured by the clock 53) is T4. The time lag between the imaging device 1 and the portable terminal device 5 can be calculated by ((T2−T1)−(T4−T3))/2. Note that a method of detecting the time difference in the time difference detection unit 542 is not limited thereto, and another method may be used.

The correction unit 543 corrects the marker input time contained in the marker time information based on the time difference acquired by the time difference detection unit 542 and thereby generates corrected marker time information. Specifically, the correction unit 543 advances or delays the marker input time contained in the marker time information by the time corresponding to the time difference acquired by the time difference detection unit 542.

Figure 7:
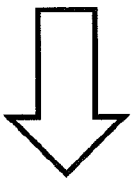
FIG. 7 is a diagram to describe correction processing of marker time information according to an exemplary embodiment.

Input time correction processing by the correction unit 543 is described hereinafter with reference to FIG. 7. FIG. 7 shows marker time information before the correction and marker time information after the correction. In the example of FIG. 7, it is assumed that the time difference detected by the time difference detection unit 542 is 3 seconds, and the clock 53 of the portable terminal device 5 is behind the clock 208 of the imaging device 1.

In the case where the clock 53 of the portable terminal device 5 is behind the clock 208 of the imaging device 1, the correction unit 543 adds the time difference (3 seconds) to the marker input time contained in the marker time information. In other words, the correction unit 543 advances the marker input time by 3 seconds from the actual input time. The correction unit 543 thereby generates corrected marker input information. On the other hand, in the case where the clock 53 of the portable terminal device 5 is ahead of the clock 208 of the imaging device 1, though not shown, the correction unit 543 subtracts the time difference from the marker input time contained in the marker time information. In other words, the correction unit 543 delays the marker input time from the actual input time.

The communication unit 55 performs wireless communication with the imaging device 1. For example, the communication unit 55 performs communication required in the time difference detection processing of the time difference detection unit 542, transmission of the corrected marker time information and the like. The memory 56 stores the marker time information, the corrected marker time information, the time difference between the clock 208 and the clock 53 and the like.

Figure 8:
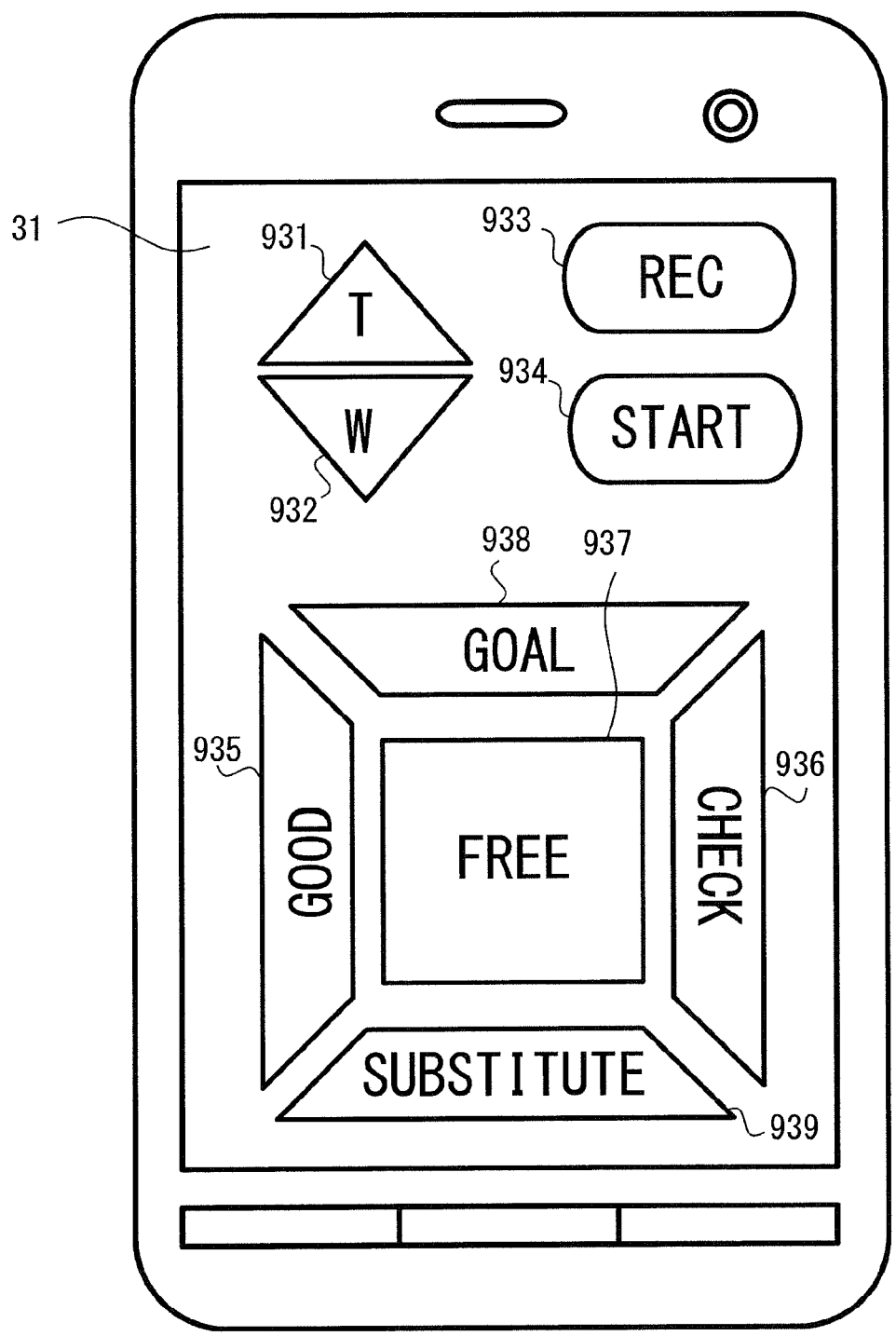
FIG. 8 is a diagram to describe an interface image of a portable terminal device according to an exemplary embodiment.

It is assumed that an application for marker input is downloaded to the portable terminal device 5 in advance. The application contains a UI (User Interface) image used when inputting a marker and the like. FIG. 8 shows an example of the UI image that is displayed in the display unit 51 of the portable terminal device 5. The portable terminal device 5 includes, as the UI image, a tele icon 931, a wide icon 932, a recording start/recording stop icon 933, a game start marker icon 934, a good marker icon 935, a check marker icon 936, a free marker icon 937, a score marker icon 938, and a substitute marker icon 939.

When the tele icon 931 is touched, the portable terminal device 5 gives an instruction to perform telescopic operation to the imaging device 1. When the wide icon 932 is touched, the portable terminal device 5 gives an instruction to perform wide-angle operation to the imaging device 1. When the recording start/recording stop icon 933 is touched, the portable terminal device 5 gives an instruction to start recording to the imaging device 1 and, if it is during recording, gives an instruction to stop recording. When the game start marker icon 934, the good marker icon 935, the check marker icon 936, the free marker icon 937, the score marker icon 938, and the substitute marker icon 939 are touched, the portable terminal device 5 executes input of a marker corresponding to each icon. Thus, the marker time information generation unit 541 generates marker time information. Note that, after the game start marker icon 934 is touched, the portable terminal device 5 may display a game end marker icon in place of the game start marker icon 934.

<Operation of Imaging System>

Figure 9:
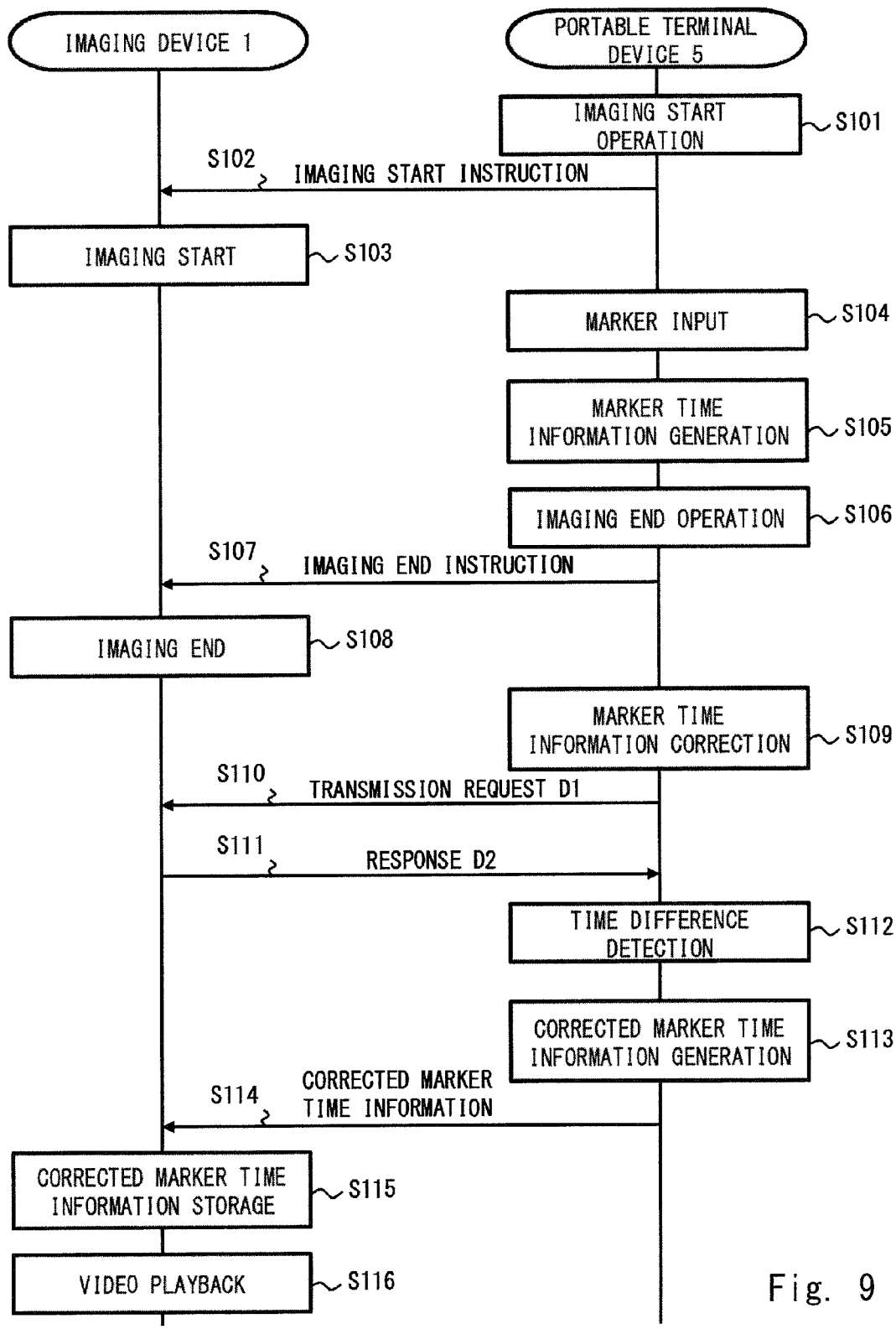
FIG. 9 is a sequence chart to describe video of an imaging system according to an exemplary embodiment.

An operation of the imaging system according to this exemplary embodiment is described hereinafter. FIG. 9 is a sequence chart showing an operation example of the imaging system.

First, a user performs an imaging start operation by touching the recording start/recording stop icon 933 of the portable terminal device 5 (Step S101). The portable terminal device 5 thereby gives an instruction to start imaging to the imaging device 1 (Step S102). The central control unit 400 receives the instruction to start imaging and then causes the imaging unit 100 to start imaging (Step S103).

Next, the user inputs a marker through the input unit 52 of the portable terminal device 5 while viewing an event (game) (Step S104). For example, the user inputs the marker by touching the game start marker icon 934, the score marker icon 938 or the like. In Step S104, a plurality of markers may be input as a matter of course.

When the marker input operation is done, the marker time information generation unit 541 generates marker time information in which the input marker and the marker input time measured by the clock 53 are associated with each other (Step S105).

After that, the user performs an imaging end operation by touching the recording start/recording stop icon 933 (Step S106). The portable terminal device 5 thereby gives an instruction to end the imaging to the imaging device 1 (Step S107). The imaging device 1 thereby ends the imaging (Step S108). The imaging data is then compressed and stored as a video file into the card type recording medium 302.

When the imaging ends, the portable terminal device 5 starts correction of the marker time information (Step S109).

Note that the processing of Step S109 is performed using an operation different from the imaging end operation (Step S106) as a trigger. As a matter of course, the processing of Step S109 may be performed using the imaging end operation (Step S106) as a trigger.

When the correction of the marker time information is started, the time difference detection unit 542 transmits a transmission request D1 for time information of the clock 208 of the imaging device 1 to the imaging device 1 (Step S110). The imaging device 1 receives the transmission request D1 and then acquires time information of the clock 208 and transmits a response D2 to the portable terminal device 5 (Step S111). The response D2 contains the time information of the clock 208, time T2 when the imaging device 1 receives the transmission request D1, and time T3 when the imaging device 1 transmits the response D2. Then, the time difference detection unit 542 detects a time difference between the clock 208 and the clock 53 based on time T1 when the transmission request D1 is transmitted, time T2 when the transmission request D1 is received, time T3 when the response D2 is transmitted, and time T4 when the response D2 is received (Step S112).

The correction unit 543 corrects the marker input time in the marker time information using the time difference detected by the time difference detection unit 542 and thereby generates corrected marker time information (Step S113). Then, the portable terminal device 5 transmits the corrected marker time information to the imaging device 1 (Step S114).

The marker data management unit 402 of the imaging device 1 stores the received corrected marker time information into the card type recording medium 302 in association with the video file generated in Step S108 (Step S115). In this step, the marker data management unit 402 performs the following steps (0) to (3), for example.

(0) Arrange the video files recorded in the imaging device 1 in order of the imaging start time from the earliest to the latest.

(1) Assign the number of video files recorded in the imaging device 1 to a variable i.

(2) If the input time of the corrected marker time information is after the imaging start time of the i-th video file, associate the corrected marker time information with the i-th video file and end the process. On the other hand, if the input time of the corrected marker time information is before the imaging start time of the i-th video file, proceed to step (3).

(3) If i>1, reduce the value of i by 1 and proceed to step (2). If i=1, discard the corrected marker time information (not associate it with any video file) and end the process.

After that, when a user performs an operation to play the video file, the video file management unit 401 plays the video corresponding to the video file based on the corrected marker time information (Step S116). Playing the video based on the corrected marker time information includes the act of playing the video from the position corresponding to the marker input time when a marker contained in the corrected marker time information is selected by a user, the act of displaying a marker image on the video (superimposing a marker image onto the video) when the time of the video reaches the time corresponding to the marker input time and the like. Note that the time (frame position) of the video to be played and the time (frame position) of the video on which the marker image is to be displayed can be specified by using the video imaging start time (the time measured by the clock 208), the elapsed time from the imaging start, and the corrected marker time information, for example.

For example, it is assumed that the video imaging start time is 9:50:50 in the example shown in FIG. 5. In the case of playing the video from the game start marker, the video file management unit 401 plays the video from the position where the time corresponding to a difference between the input time of the game start marker and the imaging start time has elapsed. Specifically, the video file management unit 401 plays the video from the position that is 9 minutes and 12 seconds after the beginning of the video file. Likewise, in the case of displaying the score marker on the video, the video file management unit 401 and the display image data generation unit 403 display the marker image on the video at the position where the time corresponding to a difference between the input time of the score marker and the imaging start time has elapsed. Specifically, the video file management unit 401 and the display image data generation unit 403 display the marker image of the score marker at the position that is 21 minutes and 18 seconds after the beginning of the video file.

Note that, in the case where time information is added to each frame of the video file, the video file management unit 401 can play the video from the frame position corresponding to the input time of the corrected marker time information or display the marker image at the same frame position.

As described above, in the configuration of the imaging system according to this exemplary embodiment, the time difference detection unit 542 detects a time difference between time of the clock 208 in the imaging device 1 and time of the clock 53 in the portable terminal device 5. Further, the correction unit 543 corrects the marker input time contained in the marker time information based on the time difference detected by the time difference detection unit 542 and thereby generates corrected marker time information. The marker data management unit 402 stores the generated corrected marker time information into the card type recording medium 302 in association with the video file. Then, the video file management unit 401 plays the video file based on the imaging time of the video file and the corrected marker time information. The marker input time contained in the marker time information is thereby corrected in accordance with the imaging device 1. Thus, a marker can be input at an appropriate position of the video even when the marker is input in the state where the imaging device and the portable terminal device are not connected (in the state where those devices are out of synchronization).

Modified Example 1

A modified example 1 of this exemplary embodiment is described hereinafter. In the imaging device according to the modified example 1, the playing method of the video file management unit 401 is different from the method described in the above exemplary embodiment. Note that the other configuration is the same as that of the imaging device 1 and not redundantly described.

The video file management unit 401 plays a video file based on the accuracy of detecting a time difference in the time difference detection unit 542. Specifically, in the case of playing video using the corrected marker time information, the video file management unit 401 plays a video file from the time prior to the play start position on the basis of the marker input time contained in the corrected marker time information according to the time difference detection accuracy. In other words, the video file management unit 401 advances the play start position of the video on the basis of the marker input time in the corrected marker time information by the time corresponding to the detection accuracy. Note that the time difference detection accuracy indicates the maximum value of an error occurring in the detection of a time difference. For example, when the clock 208 of the imaging device measures time up to the seconds, an error of 0 to 1 second can occur.

As one example, consider the case where the time difference detection accuracy is 1 second, and video is played from the game start marker where the input time in the corrected marker time information is 10:00:02. In this case, the video file management unit 401 plays the video from the scene that is 1 second before the input time (the scene corresponding to 10:00:01). Specifically, the video file management unit 401 plays the video from the time that is 1 second before the input time of the game start marker in the corrected marker time information. Stated differently, the video file management unit 401 plays the video from the time that is earlier than the time (10:00:02 in FIG. 7) generated by correcting the input time (9:59:59 in FIG. 7) of the game start marker measured by the clock 53 of the portable terminal device based on a time difference between the clock 208 and the clock 53 further by the time based on the detection accuracy (1 second).

In this configuration, the video is played from the time that is before the marker input time by the time of the maximum error. Thus, even when the maximum error occurs in the time difference detection, it is possible to prevent that the video is played from the time that is later than the marker input time. Further, in the case where there is substantially no error, the video is played from the time that is earlier than the marker input time. Accordingly, in the played video, an event where a marker is input is included without fail. In the above example, the game start scene is always included in the played video. It is thereby possible to prevent that the video is played from the point after the event where the marker is input due to the detection accuracy, causing a user to miss the event corresponding to the marker.

Note that, in consideration of an error time caused by a marker input operation, the position that is a specified time (for example, 5 seconds) before the marker input time in the corrected marker time information may be set as the play start position (the play start position of the video on the basis of the marker input time in the corrected marker time information). In this case, the video file management unit 401 advances the play start time further by the time (1 second) corresponding to the detection accuracy.

On the other hand, in the case of displaying a marker image on the video, the video file management unit 401 plays the video by superimposing the marker image onto the video at the time that is later than the play position of the marker image on the basis of the marker input time according to the time difference detection accuracy. In other words, the video file management unit 401 delays the play position of the marker image on the basis of the marker input time in the corrected marker time information by the time corresponding to the detection accuracy.

As one example, consider the case where the time difference detection accuracy is 1 second, and video on which a marker image corresponding to the score marker where the input time is 10:12:08 is superimposed is played. In this case, the video file management unit 401 displays the marker image corresponding to the score marker in the scene that is 1 second after the input time (the scene corresponding to 10:12:09) (causes the display image data generation unit 403 to superimpose the image). Specifically, the video file management unit 401 displays the marker image corresponding to the score marker at the time that is 1 second later than the input time of the score marker in the corrected marker time information. Stated differently, the video file management unit 401 plays the marker image at the position that is later than the time (10:12:08 in FIG. 7) generated by correcting the input time (10:12:05 in FIG. 7) of the game start marker measured by the clock 53 of the portable terminal device based on a time difference between the clock 208 and the clock 53 further by the time on the basis of the detection accuracy (1 second).

In this configuration, the marker image is displayed on the video at the time that is later than the marker input time by the time of the maximum error. Thus, even when the maximum error occurs in the time difference detection, it is possible to prevent that the marker image is displayed on the video earlier than the marker input time. Further, in the case where there is substantially no error, the marker image is displayed on the video later than the marker input time. Accordingly, the marker image is displayed after the event where the marker is input. In the above example, the marker image of the score marker is displayed after the score scene. It is thereby possible to prevent that the marker image is displayed before the event where the marker is input occurs due to the detection accuracy.

Note that, in consideration of an error time caused by a marker input operation, the position that is a specified time (for example, 5 seconds) after the marker input time in the corrected marker time information may be set as the play position of the marker image (the play position of the marker image on the basis of the marker input time in the corrected marker time information). In this case, the video file management unit 401 delays the play position of the marker image further by the time (1 second) corresponding to the detection accuracy.

Modified Example 2

A modified example 2 of this exemplary embodiment is described hereinafter. In the imaging device according to the modified example 2, the correction method of the correction unit 543 is different from the method described in the above exemplary embodiment. Note that the other configuration is the same as that of the imaging device 1 and not redundantly described.

In the case where a time difference detected at the first timing and a time difference detected at the second timing by the time difference detection unit 542 are different, the correction unit 543 according to the modified example 2 calculates the amount of correction of the marker input time based on the time differences detected at the first and second timing.

Figure 10:
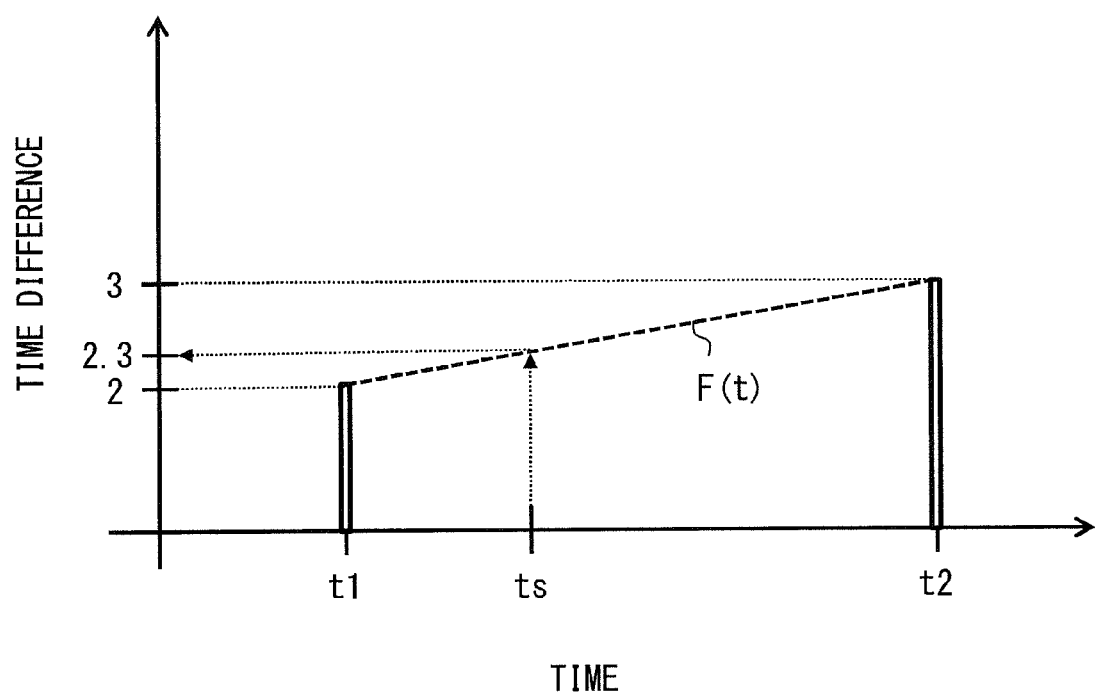
FIG. 10 is a diagram to describe correction processing according to a modified example 2.

A method of calculating the amount of correction by the correction unit 543 is described with reference to FIG. 10. In FIG. 10, the vertical axis indicates a time difference between time of the clock 208 and time of the clock 53 detected by the time difference detection unit 542, and the horizontal axis indicates time. In this example, it is assumed that the imaging device 1 and the portable terminal device 5 are connected at time t1 and time t2. In other words, detection of a time difference and transmission and reception of corrected marker time information are performed at time t1 and time t2. Note that time t1 and time t2 are time measured by the clock 208 of the imaging device 1.

In FIG. 10, it is assumed that a time difference that is detected at time t1 (first timing) by the time difference detection unit 542 is 2 seconds. Further, a time difference that is detected at time t2 (second timing) different from time t1 by the time difference detection unit 542 is 3 seconds. In each timing, the clock 53 of the portable terminal device 5 is ahead of the clock 208 of the imaging device 1. Further, a user starts imaging at time ts. Note that, as shown in FIG. 10, the case where a time difference between time of the clock 208 and time of the clock 53 varies with the detection time is when the speed of the clock 208 and the speed of the clock 53 are different, for example. Further, the time ts is time measured by the clock 208 of the imaging device 1.

Further, at time t1, the time difference detection unit 542 stores the detected time difference (2 seconds) into the memory 56 of the portable terminal device 5. After that, at time t2, the time difference detection unit 542 stores the detected time difference (3 seconds) into the memory 56.

In the case of correcting the marker input time at time t2, the correction unit 543 determines whether a time difference at time t2 and time t1 varies. When the time difference varies, the correction unit 543 calculates a function F(t) representing the variation of the time difference using the time t as a variable.

For example, the correction unit 543 calculates the slope of the function F(t) by using the variation in time (t2−t1) and the variation in time difference (3−2 seconds) between time t1 and time t2. Then, the correction unit 543 calculates the function F(t) by using the coordinates at time t1 or the coordinates at time t2.

Next, the correction unit 543 acquires imaging start time ts. The correction unit 543 uses the time when a recording start operation is performed in the portable terminal device 5 as the imaging start time ts, for example. Then, the correction unit 543 substitutes the recording start time ts into the function F(t) and calculates a time difference at the recording start time ts. In the example of FIG. 10, it is assumed that a time difference at the recording start time ts is 2.3 seconds.

The correction unit 543 corrects the marker input time in the marker time information using the time difference 2.3 seconds at the recording start time ts in the correction processing at time t2. Specifically, the correction unit 543 adds 2.3 seconds to the marker input time to delay the marker input time. Note that the subsequent operation is the same as that described in the above exemplary embodiment and not redundantly described.

In this configuration, even when a time lag between time of the clock 208 in the imaging device 1 and time of the clock 53 in the portable terminal device 5 becomes larger, it is possible to correct the marker input time using an appropriate amount of correction.

Note that, although the example of FIG. 10 shows the case where one video file is recorded between time t1 and time t2, the invention is applicable also when a plurality of video files are recorded between time t1 and time t2. In the case where a plurality of video files are recorded, the correction unit 543 performs the following steps (1) to (5), for example.

(1) Assign the number of video files recorded between time t1 and time t2 to a variable i.
(2) Substitute the imaging start time of the i-th video recorded between time t1 and time t2 into the function F(t) to calculate a time difference, and correct the input time using the time difference.
(3) If the corrected input time in step (2) is after the imaging start time of the i-th video, end the process. On the other hand, if the corrected input time is before the imaging start time of the i-th video, proceed to step (4).
(4) If i>1, reduce the value of i by 1 and proceed to step (2). If i=1, proceed to step (5).
(5) Correct input time using a time difference at time t1 and end the correction process.

Further, the correction processing by the correction unit 543 according to the modified example 1 is not limited to using the function F(t) as described above. For example, an average (2.5 seconds) between the time difference detected at the first timing (2 seconds) and the time difference detected at the second timing (3 seconds) may be used as the amount of correction, for example.

Further, in the case where a user adjusts the clock 208 of the imaging device 1 manually after the end of imaging, a time difference between the clock 208 and the clock 53 is not linear as shown in FIG. 10. Accordingly, the above method using the function cannot be used. In such a case, correction of the input time is performed using the following method. When a user adjusts the clock 208 manually, the imaging device 1 stores a flag indicating that the time is adjusted manually and time tm after adjustment into the card type recording medium 302, for example. It is assumed that the time in the previous correction measured by the clock 53 of the portable terminal device 5 is t1', and the time in the current correction is t2'. When (t2−tm) <(t2'−t1') is satisfied in the correction processing by the correction unit 543 (when the clock 208 is adjusted manually after the previous correction processing), the correction unit 543 makes correction using a time difference detected at time t2, not a time difference calculated using the function F(t). Note that time t1' and t2' of the portable terminal device 5 are used to determine whether the clock 208 is manually adjusted after the previous correction processing because time t1 measured by the clock 208 of the imaging device 1 is useless by the manual adjustment of the clock 208. Therefore, even when time adjustment is made after detection of a time difference by the time difference detection unit 542, it is possible to play the video or display a marker from an appropriate time of the video.

Although the exemplary embodiment of the present invention is described in the foregoing, the present invention is not restricted to the above-described configuration, and various changes, modifications and combinations as would be obvious to one skilled in the art may be made without departing from the scope of the invention.

For example, a part of the information stored in the card type recording medium 302 may be stored in a storage device removable from the imaging device 1 (for example, USB memory). Further, the imaging device 1 may download information to be stored in the card type recording medium 302 as appropriate from a network. Furthermore, at least a part of the information stored in the card type recording medium 302 may be stored in a storage device (not shown) in the central control unit 400.

Further, although the portable terminal device 5 includes the time difference detection unit 542 and the correction unit 543 in the exemplary embodiment described above, it is not limited thereto. For example, the imaging device 1 may include the time difference detection unit 542 and the correction unit 543. The imaging device 1 may receive marker time information (before correction) transmitted from the portable terminal device 5 and correct the marker time information.

Further, although video is played in the imaging device 1 in the exemplary embodiment described above, it is not limited thereto. An external device may play video. For example, the portable terminal device 5 transmits the corrected marker time information to an external server. Likewise, the imaging device 1 transmits a video file to the external server. Then, the video file may be played in the external server based on the corrected marker time information. In addition, the external server may include the time difference detection unit 542 and the correction unit 543.

Further, processing of the imaging device and the portable terminal device described above can be implemented as a program that operates in a given computer. The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Further, in addition to the cases where the functions of the above-described exemplary embodiment are implemented by causing a compute to execute a program that is used to implement functions of the above-described exemplary embodiment, other cases where the functions of the above-described exemplary embodiment are implemented under instructions of this program with the cooperation with the OS (Operating System) or application software running on the computer are also included in the exemplary embodiment of the present invention. Further, other cases where all or part of the processes of this program are executed by a function enhancement board inserted into the computer or a function enhancement unit connected to the computer in order to implement the functions of the above-described exemplary embodiment are also included in the exemplary embodiment of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. An imaging system comprising:
an imaging device including
a first clock unit that measures time,
an imaging unit that generates imaging data of video by imaging processing, and
a storage unit that stores a video file on a basis of the imaging data in association with imaging time of the imaging data measured by the first clock unit;
a portable terminal device including
a marker input unit that inputs a marker to the video file,
a second clock unit that measures time, and
a marker time information generation unit that generates marker time information containing the marker input by the marker input unit and input time of the marker measured by the second clock unit in association with each other;
a time difference detection unit that detects a time difference between time measured by the first clock unit and time measured by the second clock unit;
a correction unit that corrects the input time of the marker contained in the marker time information based on the time difference detected by the time difference detection unit and thereby generates corrected marker time information; and
a playing unit that plays video on a basis of the video file based on the imaging time and the corrected marker time information,
wherein the playing unit sets a play start position based on detection accuracy of the time difference of the time difference detection unit, wherein the detection accuracy corresponds to the maximum value of an error occurring in the detection of a time difference, and wherein, when a user selects the marker, the playing unit sets a time, as the play start position, when the input time of the selected marker in the corrected marker time information is advanced by a time corresponding to the detection accuracy, and plays the video from the play start position.

2. The imaging system according to claim 1, when a time difference detected at first timing and a time difference detected at second timing by the time difference detection unit are different, the correction unit calculates an amount of correction of the input time of the marker based on the time differences at the first and second timing.

3. The imaging system according to claim 2, wherein the correction unit calculates the amount of correction of the input time of the marker based on a variation in the time differences at the first and second timing, a time between the first timing and the second timing, and the input time of the marker.

4. An imaging system comprising:
an imaging device including
a first clock unit that measures time,
an imaging unit that generates imaging data of video by imaging processing, and
a storage unit that stores a video file on a basis of the imaging data in association with imaging time of the imaging data measured by the first clock unit;
a portable terminal device including
a marker input unit that inputs a marker to the video file,
a second clock unit that measures time, and
a marker time information generation unit that generates marker time information containing the marker input by the marker input unit and input time of the marker measured by the second clock unit in association with each other;
a time difference detection unit that detects a time difference between time measured by the first clock unit and time measured by the second clock unit;
a correction unit that corrects the input time of the marker contained in the marker time information based on the time difference detected by the time difference detection unit and thereby generates corrected marker time information; and
a playing unit that plays video on a basis of the video file based on the imaging time and the corrected marker time information,
wherein the playing unit plays the video based on detection accuracy of the time difference of the time difference detection unit, and
wherein, when playing the video by superimposing a marker image corresponding to the marker onto the video at the input time of the marker in the corrected marker time information, the playing unit delays a play position of the marker image on a basis of the input time of the marker in the corrected marker time information by a time corresponding to the detection accuracy.

5. An imaging device connectable with a portable terminal device capable of inputting a marker, comprising:
an imaging unit that generates imaging data of video by imaging processing;
a first clock unit that measures time;
a storage unit that stores a video file on a basis of the imaging data in association with imaging time of the imaging data measured by the first clock unit;
a receiving unit that receives corrected marker time information from the portable terminal device, the marker time information being generated by correcting marker time information containing a marker input to the video file by the portable terminal device capable of inputting a marker and input time of the marker measured by a second clock unit included in the portable terminal device in association with each other;
a playing unit that plays video on a basis of the video file based on the imaging time and the corrected marker time information; and
a time difference detection unit that detects a time difference between time measured by the first clock unit and time measured by the second clock unit,
wherein the playing unit sets a play start position based on detection accuracy of the time difference of the time difference detection unit,
wherein the detection accuracy corresponds to the maximum value of an error occurring in the detection of a time difference, and
wherein, when a user selects the marker, the playing unit sets a time, as the play start position, when the input time of the selected marker in the corrected marker time information is advanced by a time corresponding to the detection accuracy, and plays the video from the play start position.

6. An imaging device connectable with a portable terminal device capable of inputting a marker, comprising:
an imaging unit that generates imaging data of video by imaging processing;
a first clock unit that measures time;
a storage unit that stores a video file on a basis of the imaging data in association with imaging time of the imaging data measured by the first clock unit;
a receiving unit that receives corrected marker time information from the portable terminal device, the marker time information being generated by correcting marker time information containing a marker input to the video file by the portable terminal device capable of inputting a marker and input time of the marker measured by a second clock unit included in the portable terminal device in association with each other; and
a playing unit that plays video on a basis of the video file based on the imaging time and the corrected marker time information,
wherein the portable terminal device includes a time difference detection unit that detects a time difference between time measured by the first clock unit and time measured by the second clock unit,
wherein the playing unit plays the video based on detection accuracy of the time difference of the time difference detection unit, and
wherein, when playing the video by superimposing a marker image corresponding to the marker onto the video at the input time of the marker in the corrected marker time information, the playing unit delays a play position of the marker image on a basis of the input time of the marker in the corrected marker time information by a time corresponding to the detection accuracy.

7. A non-transitory computer readable medium storing a program for controlling a portable terminal device connected to an imaging device including a first clock unit that measures time, an imaging unit that generates imaging data of video by imaging processing, and a storage unit that stores a video file on a basis of the imaging data in association with imaging time of the imaging data measured by the first clock unit, the program causing a computer to execute:

a step of inputting a marker to the video file;
a step of measuring time by a second clock unit included in the portable terminal device;
a step of generating marker time information containing the input marker and input time of the marker measured by the second clock unit in association with each other;
a step of detecting a time difference between time measured by the first clock unit and time measured by the second clock unit;
a step of correcting the input time of the marker contained in the marker time information based on the detected time difference and thereby generating corrected marker time information:,
a step of setting a play start position based on detection accuracy of the time difference; and
a step of playing the video from the play start position,
wherein a play start position is set based on detection accuracy of the time difference of the time difference detection unit,
wherein the detection accuracy corresponds to the maximum value of an error occurring in the detection of a time difference, and
wherein, when a user selects the marker, a time when the input time of the selected marker in the corrected marker time information is advanced by a time corresponding to the detection accuracy is set as the play start position.

* * * * *